Figure 1:
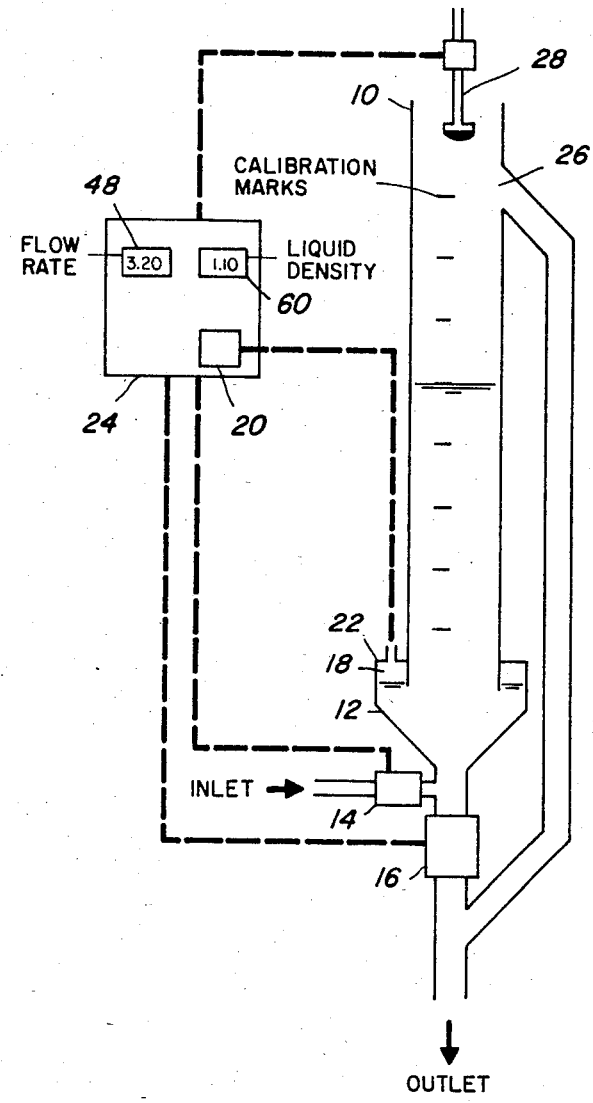

United States Patent [19]

Rosenblum et al.

[11] Patent Number: 4,597,507

[45] Date of Patent: Jul. 1, 1986

[54] APPARATUS FOR METERING AND FEEDING A SOLUTION

[75] Inventors: Frank Rosenblum, St. Laurent; Vladimir M. Labuc, Hudson, both of Canada

[73] Assignee: Noranda Inc., Toronto, Canada

[21] Appl. No.: 624,287

[22] Filed: Jun. 25, 1984

[30] Foreign Application Priority Data

Jul. 21, 1983 [CA] Canada ................................. 432947

[51] Int. Cl.⁴ .......................... B67D 5/30; B67D 5/32
[52] U.S. Cl. ......................................... 222/16; 222/40; 222/56; 222/64; 222/638; 222/71; 73/301
[58] Field of Search ...................... 222/55, 56, 52, 64, 222/14, 16, 17, 20, 21, 23, 40, 39, 71, 108, 109, 638, 15, 18, 19, 639, 644; 73/299, 301; 340/616, 618, 620

[56] References Cited

U.S. PATENT DOCUMENTS

| | | | |
|---|---|---|---|
| 3,064,859 | 11/1962 | Petrusek | 222/644 X |
| 3,224,638 | 12/1965 | Harrell, Jr. | 222/64 |
| 3,258,166 | 6/1966 | Kuckens | 222/639 |
| 3,760,981 | 9/1973 | Weed | 222/14 |
| 4,284,210 | 8/1981 | Horak | 222/23 X |
| 4,373,388 | 2/1983 | Kitamura et al. | 73/301 |
| 4,483,463 | 11/1984 | Buschmann | 222/64 |

FOREIGN PATENT DOCUMENTS 2230978  1/1975  France ................................. 222/56

Primary Examiner—Joseph J. Rolla
Assistant Examiner—Kevin P. Shaver
Attorney, Agent, or Firm—Fleit, Jacobson, Cohn & Price

[57] ABSTRACT

An apparatus for metering and feeding a solution is disclosed. The apparatus comprises a container, an inlet valve for feeding a solution into such container, and an outlet valve for allowing the solution fed into the container to flow out of the container when operated. A chamber located in the lower part of the container traps air during filing of the container at a pressure which corresponds to the hydrostatic head of solution in the container. A pressure transducer connected to the chamber provides an output signal proportional to the volume of solution in the container. A control device responsive to the output of the transducer closes the inlet valve when the predetermined volume of solution is reached and opens the outlet valve to allow discharge of the solution to the chemical process or other utilizing systems.

5 Claims, 2 Drawing Figures

APPARATUS FOR METERING AND FEEDING A SOLUTION

This invention relates to an apparatus for metering and feeding a predetermined volume of solution to a chemical process or other utilizing systems.

Metering and feeding solutions, particularly reagent solutions to chemical processes, such as flotation processes, has in the past been difficult because of low feed pressure (solution is usually gravity fed) and the presence of impurities in the solution (solids, sludge, etc.). The combination of these factors causes the conventional metering instruments to drift off calibration and often plug completely.

It is therefore the object of the present invention to provide an instrument which is not affected by the above conditions and can therefore operate for a long time with a minimum of maintenance.

The apparatus, in accordance with the present invention, comprises a container, an inlet valve for feeding a solution into such container, an outlet valve for allowing the solution fed into the container to flow out of the container when operated, a chamber located in the lower part of the container and adapted to trap air during filing of the container at a pressure which corresponds to the hydrostatic head of solution in the container, a pressure transducer connected to such chamber and adapted to provide an output signal proportional to the volume of solution in the container, and control means responsive to the output of the transducer for closing the inlet valve when the predetermined volume of solution is reached and opening the outlet valve to allow discharge of the solution to the chemical process or other utilizing systems.

The control means preferably includes an electronic circuit for closing the inlet valve and opening the outlet valve several times in a preselected time interval so as to provide a desired flow rate of solution, and display means responsive to the transducer for indicating the flow rate of solution.

The electronic control circuit preferably comprises a timer for generating pulses at predetermined time intervals, a first latch having a triggering input connected to the timer and an output connected to the outlet valve, a second latch having a triggering input connected to the timer and an output connected to the inlet valve, and means responsive to the output of the transducer for resetting the latches in the time interval between the pulses generated by the timer when the predetermined volume of solution is reached.

An alarm sensor is also preferably connected to the timer and to the second latch to provide an alarm when a new cycle is initiated by the timer before the second latch is reset.

The container is preferably provided with an overflow located at a predetermined level which is higher than the maximum volume of liquid normally fed to the container during each cycle. Such overflow is of course used for preventing overfiling of the container but it may be used to measure the density of the liquid fed to the container. For that purpose, the electronic circuit is further provided with counting means responsive to the timer for periodically maintaining the outlet valve closed for two or more consecutive cycles so as to allow the solution to overflow from the container, a time integrator responsive to the counter means for generating a signal during overflow of the solution and display means responsive to the transducer and triggered by the signal generated by the time integrator for providing an indication of the density of the solution fed into the container.

Figure 2:
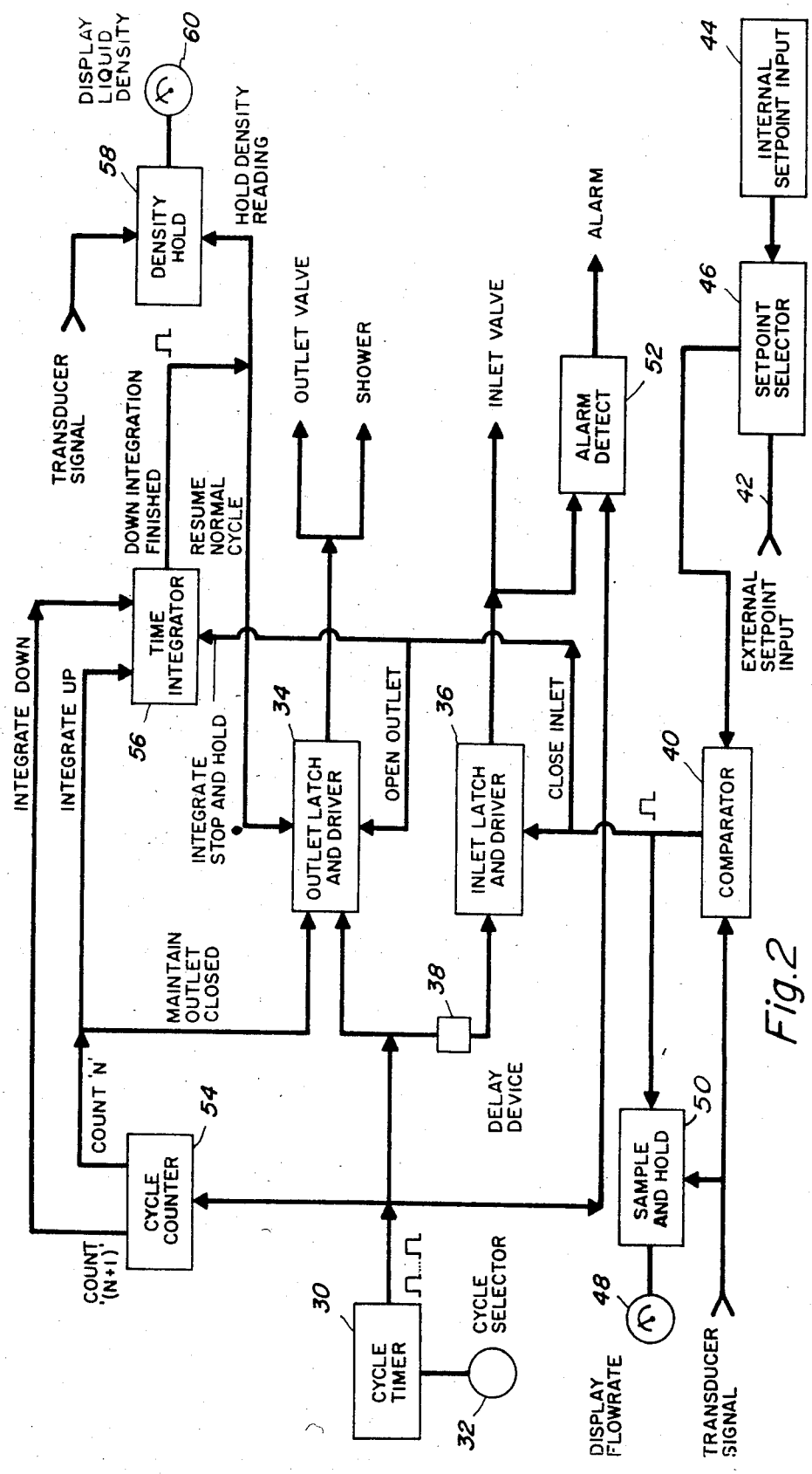

The invention will now be disclosed, by way of example, with reference to the accompanying drawings in which:

FIG. 1 illustrates a preferred embodiment of an apparatus in accordance with the invention; and FIG. 2 illustrates a preferred embodiment of an electronic control circuit for use with the apparatus shown in FIG. 1.

Referring to FIG. 1, there is shown a container in the shape of an upstanding tube 10 of constant diameter mounted above and protruding into a lower chamber 12 of larger diameter, to which a liquid inlet valve 14 and a liquid outlet valve 16 are connected. The top of the lower chamber forms an air trap 18 which traps air, as the tube is filled with liquid, at a pressure which corresponds to the hydrostatic head of the liquid in the tube. A conventional pressure transducer 20 capable of producing an output voltage proportional to the pressure in chamber 18 is connected to the top of the chamber 12 via a suitable tube 22. The signal generated by this transducer is processed by an electronic control circuit 24 to activate inlet valve 14 and outlet valve 16 and to provide an indication of the flow rate of liquid out of the tube. Tube 10 is also provided with an overflow 26 in case of maloperation of inlet and outlet valves 14 and 16 and for another purpose to be disclosed later. An overhead shower 28, used only with solutions that tend to adhere to the surrounding walls, is also shown and controlled by the electronic circuit 24.

The container 10 may be of any suitable shape and can be constructed from any suitable material but in the preferred form the vertical tube is fabricated from a clear plastic tube or pipe. The height and diameter of the column are chosen to suit the required flow rate and accuracy of the system. The range of the pressure transducer is matched with that of the column height and density of the liquid. The inlet and outlet valves can be of any shape and construction provided they are compatible with the solution and the flow rate. In the preferred form however, the inlet and outlet valves are of the pneumatic pinch type having a suitable sleeve material and with the outlet valve being larger than the inlet valve.

Metering and feeding of a solution is achieved by first allowing the solution to flow into the apparatus by closing the outlet valve 16 and opening the inlet valve 14. Referring to FIG. 2, this is automatically done by a timer 30 adapted to generate a series of pulses at predetermined intervals set by a cycle selector 32. Timer 30 operates conventional latches and drivers 34 and 36 which are electrically connected to outlet valve 16 and inlet valve 14 respectively. Latch 34 may be triggered on the leading edge of the pulse generated by timer 30 while latch 36 is triggered by the trailing edge of the pulse so as to provide a predetermined time delay between closing of the outlet valve and opening of the inlet valve to prevent loss of solution directly through the outlet valve. However, in the embodiment shown in FIG. 2, latch 36 is triggered through a delay device 38. The rising column of solution traps air in the upper section of the chamber 12, resulting in air pressure which corresponds to the hydrostatic head of liquid in the tube. The pressure transducer 20 provides a direct voltage reading of the volume of solution in the apparatus and such voltage is fed to a comparator 40 to which is also fed a reference signal from an external or internal set point input 42 or 44 as set by selector 46. The duration that the inlet valve remains open is controlled by the output of comparator 40 which is adapted to generate a reset pulse to inlet latch 36 to close inlet valve 14 as soon as a predetermined volume of solution has entered the apparatus. The voltage corresponding to such volume of solution is also fed to a panel meter 48 through a sample and hold device 50 under the control of the reset pulse of the comparator. The output pulse of comparator 40 is also fed to outlet latch and driver 34 to discharge the solution to the chemical process or other utilizing system. The cycle of filling and discharging of solution is repeated several times in a preselected time interval under the control of timer 30 to suit the desired flow rate. The shower 28 is activated by latch 34 at the same time as the outlet valve 16. An alarm sensor 52 which may be in the form of a type D flip-flop is connected to the outputs of timer 30 and latch 36 for providing an alarm if the output of latch 36 is still high (inlet valve open) when timer 30 generates a pulse to initiate a new cycle.

The apparatus can also be used as a liquid density monitor. This can be achieved by periodically keeping inlet valve 14 open and outlet valve 16 closed for a period of two or more cycles under the control of additional circuitry also shown in FIG. 2. During the second fill cycle the solution will overflow at the upper discharge 26 and the output voltage from the transducer 20 will be a direct function of liquid density since the solution height will then be constant (pressure=density X height of solution). The output of timer 30 is applied to a cycle counter 54 which generates a first output pulse at count "N" and a second output pulse at count "N+1". The output pulse generated at count "N" is applied to a time integrator 56 which generates a ramp signal which is interrupted by the reset pulse generated by comparator 40 during the time interval between pulses "N" and "N+1". The output pulse generated at count N also inhibits the latch 34 to maintain the outlet valve closed when the inlet valve is reset by comparator 40 between cycles "N" and "N+1". The output pulse generated at count "N+1" initiates down ingegration of time integrator 56. When the ramp voltage is back to zero, the time integrator 56 generates an output pulse which corresponds to an interval of two full cycles of timer 30. This output pulse is fed to a density hold device 58 which will then display the reading of the transducer on panel meter 60. The output of time integrator 56 is also applied to outlet latch 34 to cancel the inhibit signal generated by cycle counter 54 at count "N" and so cause the apparatus to resume normal operation.

A prototype version of the apparatus has been installed at Matagami Mines, Matagami, Quebec to monitor the flow rate (10-15 L/min) of copper sulphate solution, which is a crucial reagent in the flotation of zinc. The operation of the disclosed instrument has not been affected by the low feed pressure and the presence of impurities in the solution, mostly due to the fact that the solution is never in contact with the apparatus for measuring the hydrostatic head of liquid in the container, and has been in operation for many weeks with a minimum of maintenance.

Although the invention has been disclosed with reference to a preferred embodiment, it is to be understood that other alternatives are envisaged within the scope of the following claims.

We claim:
1. An apparatus for metering and feeding a predetermined volume of solution to a chemical process or other receiving system, said apparatus comprising:
   (a) a container;
   (b) an inlet valve for feeding a solution into said container;
   (c) an outlet valve for allowing the solution fed into the container to flow out of the container when operated;
   (d) a chamber located in the lower part of the container and adapted to trap air during filling of the container at a pressure which corresponds to the hydrostatic head of solution in the container;
   (e) a pressure transducer connected to said chamber and adapted to provide an output signal proportional to the volume of solution in the container; and
   (f) control means responsive to the output of the transducer for closing said inlet valve when said predetermined volume of solution is reached and opening said outlet valve to allow discharge of the solution, said control means including an electronic circuit for regulating and controlling a cycle of closing said inlet valve and opening said outlet valve several times in a preselected time interval so as to provide a desired flow rate of solution and an alarm sensor responsive to said electronic circuit for providing an alarm when a new cycle is initiated by the electronic circuit prior to said predetermined volume of solution being reached.

2. An apparatus as defined in claim 1, wherein said control means includes display means responsive to said transducer for indicating the flow rate of solution to the chemical process or other receiving system.

3. An apparatus as defined in claim 2, wherein said electronic circuit comprises a timer for generating pulses at predetermined time intervals, a first latch having a triggering input connected to said timer and an output connected to said outlet valve, a second latch having a triggering input connected to the timer and an output connected to said inlet valve, and means responsive to the output of the transducer for resetting the latches in the time interval between the pulses generated by said timer when said predetermined volume of solution is reached.

4. An apparatus as defined in claim 3, wherein said alarm sensor is responsive to said timer and to said second latch to provide said alarm when said new cycle is initiated by the timer before the second latch is reset.

5. An apparatus as defined in claim 3, wherein said container is provided with an overflow device at a predetermined level which is higher than the maximum volume of liquid normally fed to the container during each cycle, and wherein said electronic circuit further comprises counter means responsive to said timer for periodically generating a signal to maintain the outlet valve closed for two or more consecutive cycles so as to allow the solution to overflow from the container, a time integrator responsive to said counter means for generating a signal during overflow of said solution, and second display means responsive to said transducer and triggered by the signal generated by said time integrator for providing an indication of the density of the solution fed into the container.

* * * * *